United States Patent [19]
Cheng

[11] Patent Number: 5,180,455
[45] Date of Patent: Jan. 19, 1993

[54] PNEUMATIC TIRE AND IMPROVED INFLATION AND DEFLATION VALVE DEVICE

[76] Inventor: Ying-Hsung Cheng, Av. Hipolito Yrigoyen 12904 Adrogue Provincia, Buenos Aires, Argentina

[21] Appl. No.: 741,555

[22] Filed: Aug. 7, 1991

[51] Int. Cl.$^5$ .............................................. B60C 5/24
[52] U.S. Cl. ............................. 152/338.1; 152/342.1; 152/331.1; 137/223
[58] Field of Search ............... 152/331.1, 333.1, 337.1, 152/338.1, 339.1, 340.1, 341.1, 342.1, 415, 431; 137/223, 224, 225; 251/61.3

[56] References Cited

U.S. PATENT DOCUMENTS

| | | | |
|---|---|---|---|
| 1,260,304 | 3/1918 | Betham | 152/337.1 |
| 1,442,436 | 1/1923 | Margraf | 152/338.1 |
| 1,443,258 | 1/1923 | Granat | 152/338.1 |
| 1,886,094 | 11/1932 | Guenard | 152/337.1 |
| 2,155,206 | 4/1939 | Steindel | 152/337.1 |
| 3,283,799 | 11/1966 | Barbera | 152/338.1 |
| 3,438,419 | 4/1969 | Barbera | 152/338.1 |

Primary Examiner—Michael W. Ball
Assistant Examiner—Francis J. Lorin
Attorney, Agent, or Firm—Leydig, Voit & Mayer

[57] ABSTRACT

A pneumatic tire includes an inflatable tire tube having a plurality of inflatable cell units arranged in an annular formation. A check valve is provided in a cell inlet opening of each cell unit. A control chamber is disposed adjacent to each cell unit and includes a diaphragm member provided therein so as to partition the control chamber into first and second fluid compartments. The first and second fluid compartments of the control chambers are respectively connected to and communicated with those of adjacent control chambers. Each check valve has a first portion extending into one of the cell units and a second portion extending into the first fluid compartment of one of the control chambers. A first tire valve is provided to charge air into and to release air from the second fluid compartment of each of the control chambers so as to move the respective diaphragm member to correspondingly open and close the check valves. A second tire valve is provided to charge air into and to release air from the first fluid compartment of each of the control chambers so as to inflate or deflate the cell units when the respective check valves are open.

7 Claims, 5 Drawing Sheets

PNEUMATIC TIRE AND IMPROVED INFLATION AND DEFLATION VALVE DEVICE

BACKGROUND OF THE INVENTION

1. Field of the Invention

This invention relates to a pneumatic tire, and more particularly to a pneumatic automobile tire including an inner tube consisting of a plurality of inflatable cell units, each being provided with an inflation and deflation valve device through which simultaneous inflation and deflation of the cell units may be achieved, whereby the puncturing of one cell unit would not deflate the entire tire.

2. Description of the Related Art

FIG. 1 is an illustration of a typical tire check valve used in combination with most pneumatic tires. The check valve opens when air pressure is applied, and closes when air pressure is removed, A valve cap (B) is provided to prevent air from seeping out of the tire. Without the valve cap (B), pressure applied on a shaft (A) of the check valve can open the check valve and release the air inside the pneumatic tire. This results in excessive tire wear if the tire is operated in the under-inflated condition.

U.S. Pat. No. 2,155,206 discloses a pneumatic tire which comprises a plurality of complementary cell units arranged in an annular formation. There is provided a plurality of inflation and deflation valve means for inflating the cell units and means for maintaining the cell units in the arranged annular formation. A main advantage of using the pneumatic tire of this patent is that the puncturing of one cell unit will not deflate the entire tire. A chain is operated so that the inflation and deflation valve means can be simultaneously opened to thereby deflate the cell units. One of the main drawbacks of the pneumatic tire disclosed in this patent is that the construction thereof is relatively complicated. The actual length of the chain is subject to temperature variations, which could cause untimely opening of the inflation and deflation valve means. Furthermore, operation of the chain does not ensure that all of the inflation and deflation valve means will be opened. Uneven deflation of the cell units is thus quite likely to occur.

Note that deflation of a pneumatic tire incorporating the tire check valve shown in FIG. 1 and the pneumatic tire disclosed in U.S. Pat. No. 2,155,206 can be easily accomplished by a prankster. In the former, the valve cap is simply removed and pressure is exerted on the shaft so as to deflate the pneumatic tire. In the latter, the chain is simply pulled so as to deflate the cell units.

SUMMARY OF THE INVENTION

Therefore, the main objective of the present invention is to provide a pneumatic tire having an inflatable cell unit and an improved inflation and deflation valve device which prevents the deflation of the cell unit without the use of appropriate tools, thereby making it difficult for pranksters to deflate the present invention.

Accordingly, the preferred embodiment of a pneumatic tire of the present invention comprises: an inflatable tire tube having a plurality of inflatable cell units arranged in an annular formation; a plurality of check valve means each being provided in a cell inlet opening of one of the cell units and each including a tubular valve stem having a first portion extending into one of the cell units and a second portion extending outwardly from the cell inlet opening, a hollow valve body provided inside the valve stem and having an open-ended wide portion communicated with the second portion of the valve stem and an open-ended tapered portion defining a valve seat and extending into the first portion of the valve stem, a shaft extending axially through the valve body and the valve stem, a piston provided on an intermediate portion of the shaft in the first portion of the valve stem, and a biasing means to urge the piston to seal the valve seat; a plurality of control chambers each being disposed adjacent to the cell inlet opening of one of the inflatable cell units and each including a diaphragm means provided therein so as to partition each of the control chambers into a first fluid compartment disposed adjacent to the one of the cell units and a second fluid compartment, the first fluid compartment of each of the control chambers being connected to and communicated with the first fluid compartment of adjacent control chambers, the second fluid compartment of each of the control chambers being connected to and communicated with the second fluid compartment of adjacent control chambers, the second portion of the tubular valve stem of a corresponding one of the check valve means extending into and being communicated with the first fluid compartment, the shaft of the corresponding one of the check valve means having one end extending into the first fluid compartment and being secured to the diaphragm means so as to permit axial movement of the shaft with the diaphragm means to correspondingly move the piston toward and away from the valve seat; a first tire valve means to charge air into and to release air from the second fluid compartment of each of the control chambers so as to move the diaphragm means of each of the control chambers and axially move the shaft of the corresponding one of the check valve means to correspondingly move the piston toward and away from the valve seat; and a second tire valve means to charge air into and to release air from the first fluid compartment of each of the control chambers so as to inflate or deflate the inflatable cell units when the piston of the corresponding check valve means is displaced from the valve seat.

The inflatable tire tube comprises a pair of complementary annular tubes glued to one another. Each of the complementary annular tubes is provided with a plurality of transverse partition walls so as to form the inflatable cell units. The partition walls of one of the complementary annular tubes form a staggered arrangement with the partition walls of the other one of the complementary annular tubes. Thus, when one of the cell units is punctured, the shapes of the remaining cell units are automatically adjusted so as to compensate for the deformation of the punctured cell unit, thereby maintaining proper rotation of the pneumatic tire even when puncturing occurs.

The pneumatic tire further comprises a wheel rim having an outer surface provided with spaced outwardly extending radial projections that define a pair of elongated annular receiving spaces. The control chambers are secured in an angularly spaced arrangement on the wheel rim in the annular receiving spaces. The inner periphery of an outer tire tube is mounted around the wheel rim. The inflatable tire tube is confined inside the outer tire tube.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
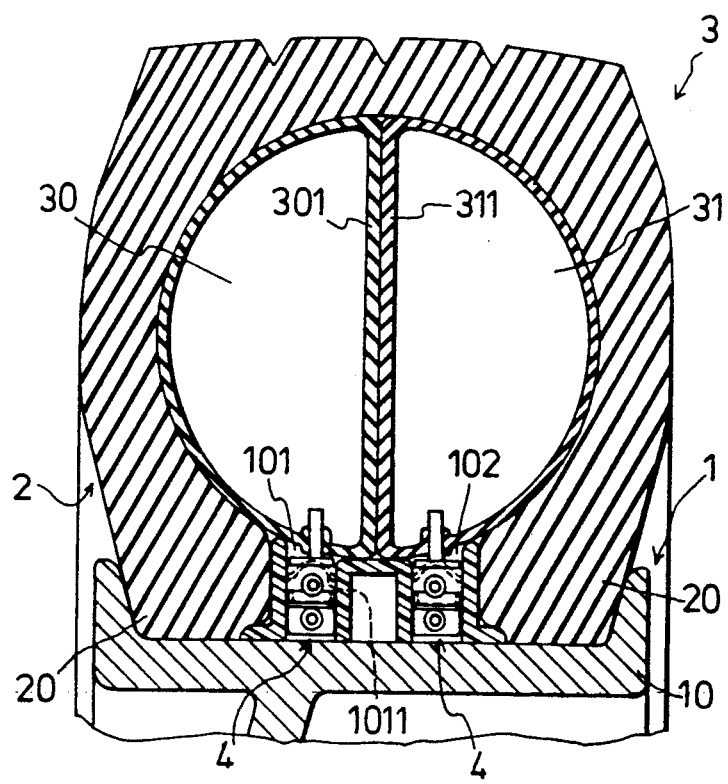
FIG. 2 is a transverse sectional view of the preferred embodiment of a pneumatic tire according to the present invention.

Referring to FIG. 2, the preferred embodiment of a pneumatic tire according to the present invention is shown to comprise a metal wheel rim 1, an outer tire tube 2, an inflatable tire tube 3, and a plurality of valve devices 4.

Figure 3A:
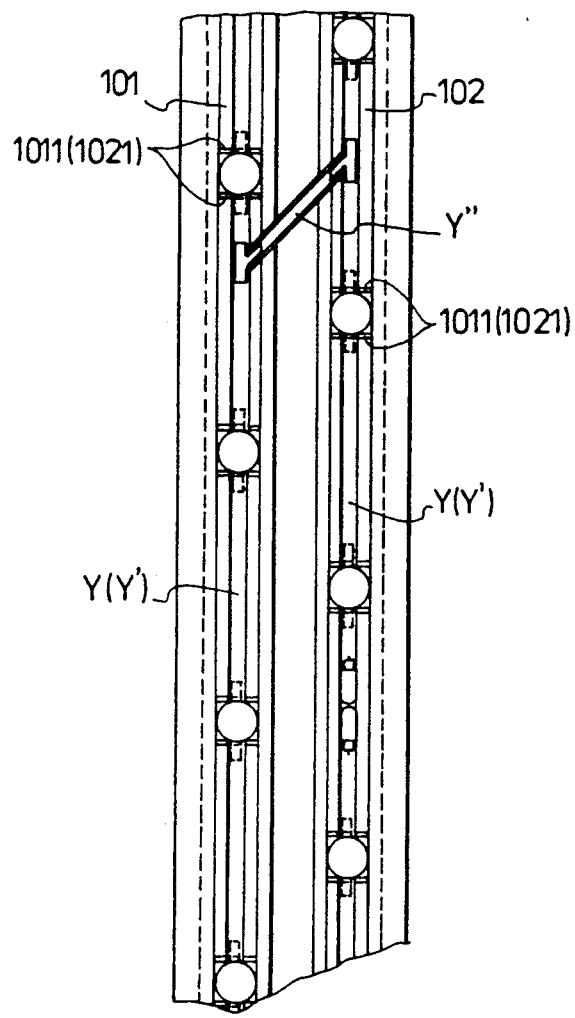
FIG. 3A is a top view of a metal wheel rim of the pneumatic tire of the present invention.

The outer surface of the wheel rim 1 is provided with spaced outwardly extending radial projections (made of a flexible material such as rubber or flexible plastic) that define a spaced pair of elongated annular receiving spaces, 101 and 102. Referring to FIG. 3A, which is a top view of the wheel rim 1, a plurality of spaced rubber rib pairs, 1011 and 1021, extend across each receiving space, 101 and 102. The rib pairs, 1011 and 1021, are used to secure the valve devices 4 on the wheel rim 1 (Refer to FIG. 4A). The rib pairs 1011 hold a fluid compartment 41 of the valve devices 4, while the rib pairs 1021 hold a fluid compartment 40 of the valve devices 4. The inner periphery 20 of the outer tire tube 2 is mounted around the wheel rim 1.

Figure 5:
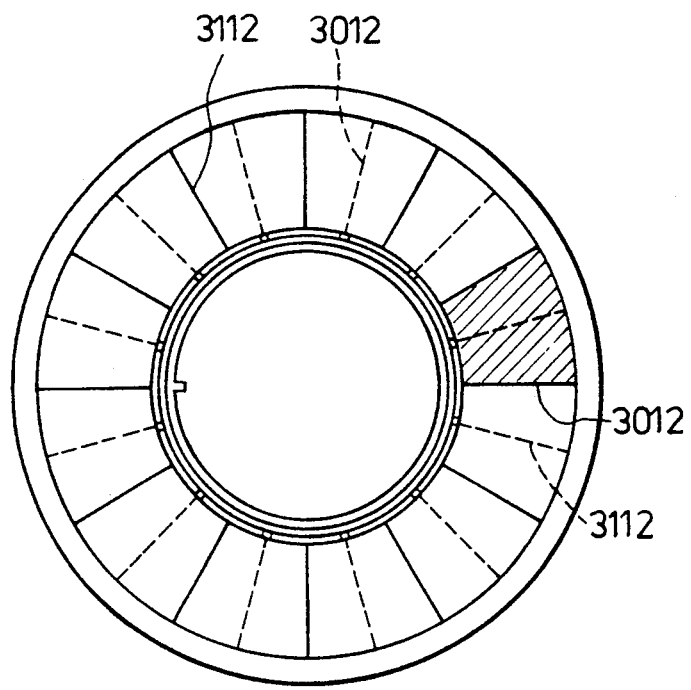
FIG. 5 is a schematic side view of the preferred embodiment illustrating the staggered arrangement of a plurality of inflatable cell units thereof.
Figure 6:
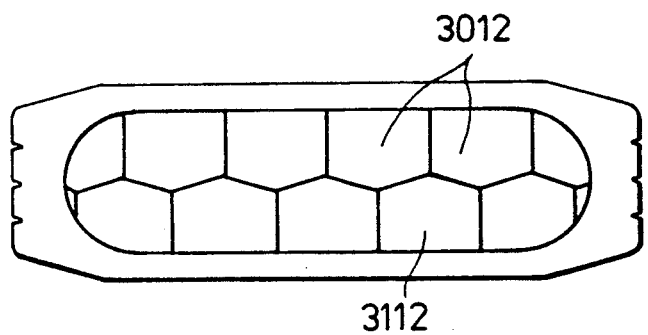
FIG. 6 is a partially cut-away view of the preferred embodiment illustrating the inflatable cell units when in a fully inflated state.

The inflatable tire tube 3 is confined inside the outer tire tube 2 and comprises a pair of complementary annular tubes, 30 and 31, each having one side, 301 and 311, glued to one another. Each of the annular tubes, 30 and 31, are provided with a plurality of transverse partition walls so as to divide the same into twelve inflatable cell units, 3012 and 3112, respectively (Refer to FIG. 5). The partition walls of the annular tubes, 30 and 31, are in a staggered arrangement so that the inflatable cell units, 3012 and 3112, are similarly in a staggered arrangement relative to each other. FIG. 6 is an illustration of the inflatable tire tube 3 when fully inflated. When one of the inflatable cell units, 3012 and 3112, is punctured, the shapes of the remaining cell units are automatically adjusted so as to compensate for the deformation of the punctured cell unit. This ensures that the proper rotation of the pneumatic tire of the present invention is maintained.

Figure 3B:
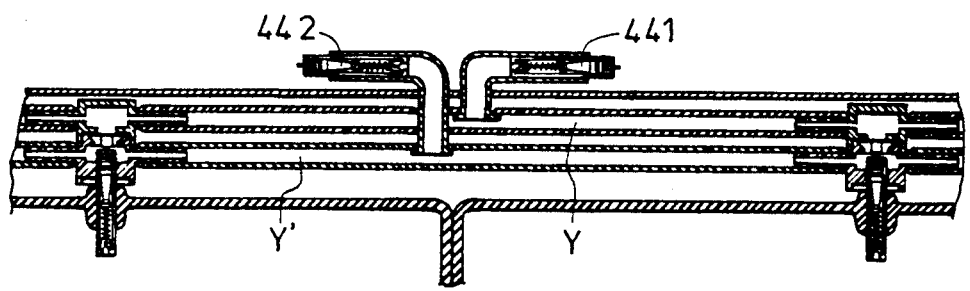
FIG. 3B is a longitudinal fragmentary sectional view of the preferred embodiment.
Figure 4A:
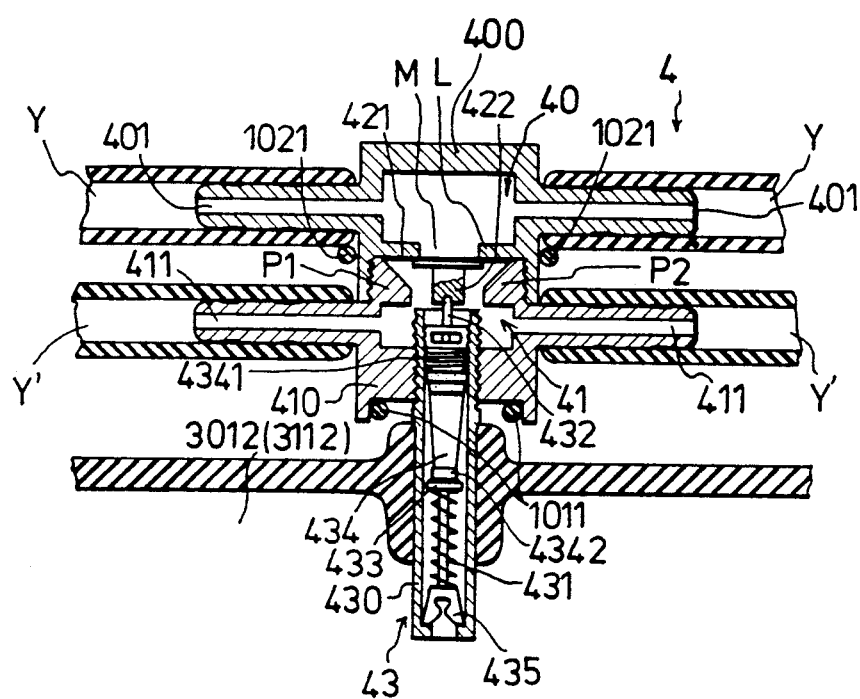
FIG. 4A is a sectional view of a valve device of the pneumatic tire of the present invention when in a closed position.

The valve devices 4 are secured in an angularly spaced arrangement on the wheel rim 1 in one of the receiving spaces, 101 and 102, provided thereon. Referring to FIGS. 3B and 4A, each of the valve devices 4 comprises a control chamber including fluid compartments, 40 and 41, and a diaphragm means 42, and a check valve means 43. The pneumatic tire of the present invention further comprises a first tire valve 441 and a second tire valve 442, each being mounted on the wheel rim 1.

The control chamber has two hollow enclosed housings, 400 and 410, that respectively confine the fluid compartments, 40 and 41. Each of the hollow enclosed housings, 400 and 410, is provided with a pair of oppositely extending horizontal spouts, 401 and 411. The hollow enclosed housing 400 has a lower open end provided with internal threads to engage the external threads of an upper open end of the enclosed housing 410. The fluid compartments, 40 and 41, are partitioned and isolated from one another by the diaphragm means 42. The diaphragm means 42 includes a thin membrane 421 and an axial connector 422 attached to one side of the membrane 421. The periphery of the thin membrane 421 is clamped between the enclosed housings, 400 and 410. The upper open end of the enclosed housing 410 is provided with a pair of inwardly extending projections, (P1) and (P2), which define a gradually converging opening so as to limit the downward movement of the thin membrane 421. The enclosed housing 400 is provided with an inward flange (L) disposed adjacent to the fluid compartment 41. The inward flange (L) defines a central opening (M) and limits the upward movement of the thin membrane 421.

Figure 1:
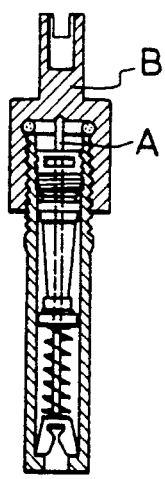
FIG. 1 is an illustration of a tire check valve of a conventional pneumatic tire.

The check valve means 43 is similar in construction to the tire check valve shown in FIG. 1 and comprises a tubular valve stem 430, a compression spring 431, a shaft 432, a piston 433, a hollow valve body 434 and a spring support 435. The check valve means 43 is provided in a cell inlet opening of a corresponding one of the cell units, 3012 and 3112. The valve stem 430 has a first portion extending into the cell unit and a second portion extending outwardly from the cell unit and into the fluid compartment 41. The hollow valve body 434 is provided inside the valve stem 430 and has an open-ended wide portion 4341 communicated with the second portion of the valve stem 430 and an open-ended tapered portion 4342 defining a valve seat and extending into the first portion of the valve stem 430. The shaft 432 extends axially through the valve body 434 and the valve stem 430. The piston 433 is provided on an intermediate portion of the shaft 432 in the first portion of the valve stem 430. The spring support 435 is provided in a distal end of the first portion of the valve stem 430. The compression spring 431 is provided around the portion of the shaft 432 between the piston 433 and the spring support 435 and urges the piston 433 to normally seal the valve seat of the valve body 434.

Axial movement of the shaft 432 can be controlled via the diaphragm means 42. The shaft 432 has one end extending into the fluid compartment 41 and attached to the axial connector 422. Pressure is applied on the side of the thin membrane 421 facing the fluid compartment 40 so as to move the shaft 432 axially downward.

A plurality of tubes (Y) connect and communicate the respective fluid compartment 40 of adjacent valve devices 4 at the spouts 401, while a plurality of tubes (Y') connect and communicate the respective fluid compartment 41 of the valve devices 4 at the spouts 411. Referring once more to FIGS. 3B and 4A, the first tire valve 441 is attached to one of the tubes (Y) so as to access the fluid compartment 40 of the valve devices 4, while the second tire valve 442 is attached to one of the tubes (Y') so as to access the fluid compartment 41. Referring once more to FIG. 3A, tubes (Y") are provided so as to communicate the tubes, (Y) and (Y'), in the receiving space 101 with the corresponding tubes, (Y) and (Y'), in the receiving space 102.

Figure 4B:
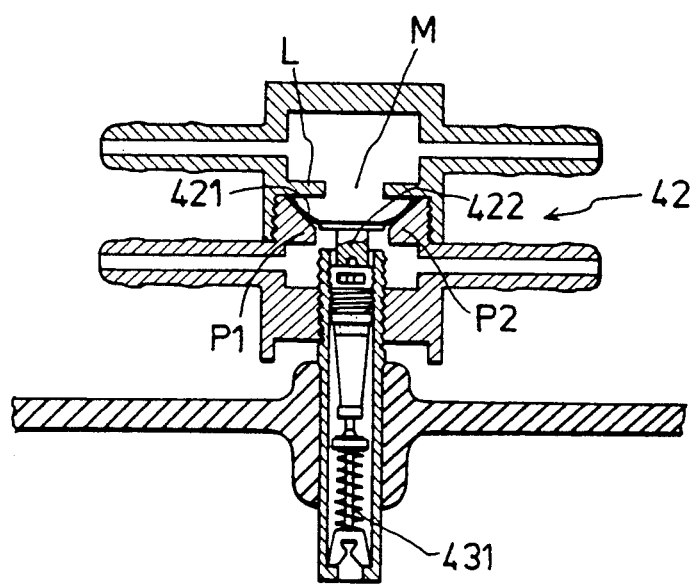
FIG. 4B is a sectional view of the valve device shown in FIG. 4A when in an open position.

Inflation of the pneumatic tire of the present invention proceeds as follows: Referring to FIGS. 3B and 4A, air is charged into the respective fluid compartment 40 of the valve devices 4 via the first tire valve 441. When the air pressure inside the fluid compartment 40 becomes greater than that inside the fluid compartment 41 and is sufficient to overcome the spring force of the compression spring 431 of the check valve means 43, the thin membrane 421 is urged downward to correspondingly move the shaft 432 axially downward. The piston 433 moves away from the valve seat of the valve body 434, as shown in FIG. 4B. The fluid compartment 41 of the valve device 4 is now in communication with the corresponding inflatable cell unit, 3012 or 3112. Air is then charged into the respective fluid compartment 41 of the valve devices 4 via the second tire valve 442 so as to inflate the inflatable cell units, 3012 and 3112. Air inside the fluid compartment 40 is then released until the air pressure therein becomes less than or equal to the air pressure inside the fluid compartment 41. Under this condition, the compression spring 431 expands to urge the piston 433 to once more seal the valve seat of the valve body 434. The thin membrane 421 is also moved so as to again abut upon the inward flange (L), as shown in FIG. 4A.

Should the pneumatic tire of the present invention become worn and damaged to an extent that its replacement is warranted, the pneumatic tire can be deflated as follows: Air is first charged into the respective fluid compartment 40 of the valve devices 4 via the first tire valve 441 so as to move the piston 433 away from the valve seat of the valve body 434. The second tire valve 442 is then opened so that air inside the inflatable cell units, 3012 and 3112, can be released via the fluid compartment 41 of the valve device 4.

The advantages of using the pneumatic tire of the present invention are as follows:

1. Removal of the valve caps of the first and second tire valves, 441 and 442, does not affect air pressure inside the inflatable cell units, 3012 and 3112. Furthermore, deflation of the pneumatic tire of the present cannot be achieved without the use of appropriate tools, thereby ensuring that untimely deflation of the present invention is prevented.

2. The inflatable cell units, 3012 and 3112, are in a staggered arrangement relative to each other so that when one of the inflatable cell units, 3012 and 3112, is punctured, the shapes of the remaining cell units are automatically adjusted so as to compensate for the deformation of the punctured cell unit. This ensures that proper rotation of the pneumatic tire of the present invention is maintained.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A pneumatic tire, comprising:
   an inflatable cell unit having a cell inlet opening;
   a check valve means provided in said cell inlet opening and including a tubular valve stem having a first portion extending into said inflatable cell unit and a second portion extending outwardly from said cell inlet opening, a hollow valve body provided inside said valve stem and having an open-ended wide portion communicated with said second portion of said valve stem and an open-ended tapered portion defining a valve seat and extending into said first portion of said valve stem, a shaft extending axially through said valve body and said valve stem, a piston provided on an intermediate portion of said shaft in said first portion of said valve stem, and a biasing means to urge said piston to seal said valve seat;
   a control chamber disposed adjacent to said cell inlet opening of said inflatable cell unit and including a diaphragm means provided therein so as to partition said control chamber into a first fluid compartment disposed adjacent to said inflatable cell unit and a second fluid compartment, said second portion of said tubular valve stem extending into and being communicated with said first fluid compartment, said shaft having one end extending into said first fluid compartment and being secured to said diaphragm means so as to permit axial movement of said shaft with said diaphragm means to correspondingly move said piston toward and away from said valve seat;
   a first tire valve means to charge air into and to release air from said second fluid compartment so as to move said diaphragm means and axially move said shaft to correspondingly move said piston toward and away from said valve seat; and
   a second tire valve means to charge air into and to release air from said first fluid compartment so as to inflate or deflate said inflatable cell unit when said piston is displaced from said valve seat.

2. A pneumatic tire, comprising:
   an inflatable tire tube having a plurality of inflatable cell units arranged in an annular formation, each of said cell units having a cell inlet opening;
   a plurality of check valve means each being provided in said cell inlet opening of one of said cell units and each including a tubular valve stem having a first portion extending into said one of said cell units and a second portion extending outwardly from said cell inlet opening, a hollow valve body provided inside said valve stem and having an open-ended wide portion communicated with said second portion of said valve stem and an open-ended tapered portion defining a valve seat and extending into said first portion of said valve stem, a shaft extending axially through said valve body and said valve stem, a piston provided on an intermediate portion of said shaft in said first portion of said valve stem, and a biasing means to urge said piston to seal said valve seat;
   a plurality of control chambers each being disposed adjacent to said cell inlet opening of one of said inflatable cell units and each including a diaphragm means provided therein so as to partition each of said control chambers into a first fluid compartment disposed adjacent to said one of said cell units and a second fluid compartment, said first fluid compartment of each of said control chambers being connected to and communicated with said first fluid compartment of adjacent said control chambers, said second fluid compartment of each of said control chambers being connected to and communicated with said second fluid compartment of adjacent said control chambers, said second portion of said tubular valve stem of a corresponding one of said check valve means extending into and being communicated with said first fluid compartment, said shaft of the corresponding one of said check valve means having one end extending into said first fluid compartment and being secured to said diaphragm means so as to permit axial movement of said shaft with said diaphragm means to correspondingly move said piston toward and away from said valve seat;

a first tire valve means to charge air into and to release air from said second fluid compartment of each of said control chambers so as to move said diaphragm means of each of said control chambers and axially move said shaft of the corresponding one of said check valve means to correspondingly move said piston toward and away from said valve seat; and a second tire valve means to charge air into and to release air from said first fluid compartment of each of said control chambers so as to inflate or deflate said inflatable cell units when said piston of the corresponding said check valve means is displaced from said valve seat.

3. The pneumatic tire as claimed in claim 2, wherein said inflatable tire tube comprises a pair of complementary annular tubes glued side by side to one another, each of said complementary annular tubes being provided with a plurality of transverse partition walls so as to form said inflatable cell units.

4. The pneumatic tire as claimed in claim 3, wherein said partition walls of one of said complementary annular tubes form a staggered arrangement with said partition walls of the other one of said complementary annular tubes.

5. The pneumatic tire as claimed in claim 2, further comprising:

a wheel rim having an outer surface provided with at least one elongated annular receiving space, said control chambers being secured in an angularly spaced arrangement on said wheel rim in said annular receiving space, said first and said second tire valve means being mounted on said wheel rim; and an outer tire tube having an inner periphery mounted around said wheel rim, said inflatable tire tube being confined inside said outer tire tube.

6. The pneumatic tire as claimed in claim 5, wherein said wheel rim is provided with spaced outwardly extending radial projections that define said elongated annular receiving space.

7. The pneumatic tire as claimed in claim 6, wherein said radial projections are made of a flexible material.

* * * * *